United States Patent [19]
Khokhar

[11] Patent Number: 6,076,235
[45] Date of Patent: Jun. 20, 2000

[54] CABLE TIE

[75] Inventor: Wasim Khokhar, Cordova, Tenn.

[73] Assignee: Thomas & Betts International, Inc, Sparks, Nev.

[21] Appl. No.: 09/295,053

[22] Filed: Apr. 20, 1999

[51] Int. Cl.[7] ................................ B65D 63/00; F16L 3/00
[52] U.S. Cl. .............................. 24/25; 24/20 R; 24/20 W; 24/21; 24/23 W
[58] Field of Search ................................ 24/25, 20 R, 21, 24/23 R, 23 EE, 23 W, 20 W, 20 EE

[56] References Cited

U.S. PATENT DOCUMENTS

| | | | |
|---|---|---|---|
| 2,491,290 | 12/1949 | Tinnerman | 24/73 |
| 3,015,865 | 1/1962 | Rapuzzi | 24/21 |
| 3,757,387 | 9/1973 | Bush et al. | 24/81 |
| 4,366,602 | 1/1983 | Conlon et al. | 24/25 |
| 4,399,592 | 8/1983 | Chopp, Jr. et al. | 24/25 |
| 4,402,113 | 9/1983 | Smith | 24/20 R |
| 4,446,603 | 5/1984 | Guiler | 24/20 R |
| 5,115,541 | 5/1992 | Stichel | 24/20 R |
| 5,291,637 | 3/1994 | Meyers | 24/25 |
| 5,732,446 | 3/1998 | Blanks | 24/25 |
| 5,732,466 | 3/1998 | Blanks | 24/25 |
| 5,850,674 | 12/1998 | Jansen | 24/25 |

OTHER PUBLICATIONS

"Design News" –Dec. 1999 –Circle 268

Primary Examiner—Victor N. Sakran
Attorney, Agent, or Firm—Brian S. Welborn

[57] ABSTRACT

A ball/roller-lock cable tie for holding an article or group of articles together in a bundle including a elongate strap body capable of being deformed to encompass the article or group of articles; a locking head disposed adjacent one end of the strap body for receiving a second end of the strap body; and a ball or cylindrical pin, positioned within the locking head, for lockingly engaging the second end of the strap body. The tie further includes a strap body extension attached to and extending from the locking head such that the extension is sandwiched between the article or articles being bundled and the second end of the strap body upon insertion into the locking head. The extension includes a beam spring assembly for supplying a reactive force necessary to substantially prevent retrograde movement of the second end of the strap body within the locking head thereby maintaining locking of the second end of the strap body within the locking head and for enhancing the clenching of the strap body around the article or group of articles being bundled.

4 Claims, 11 Drawing Sheets

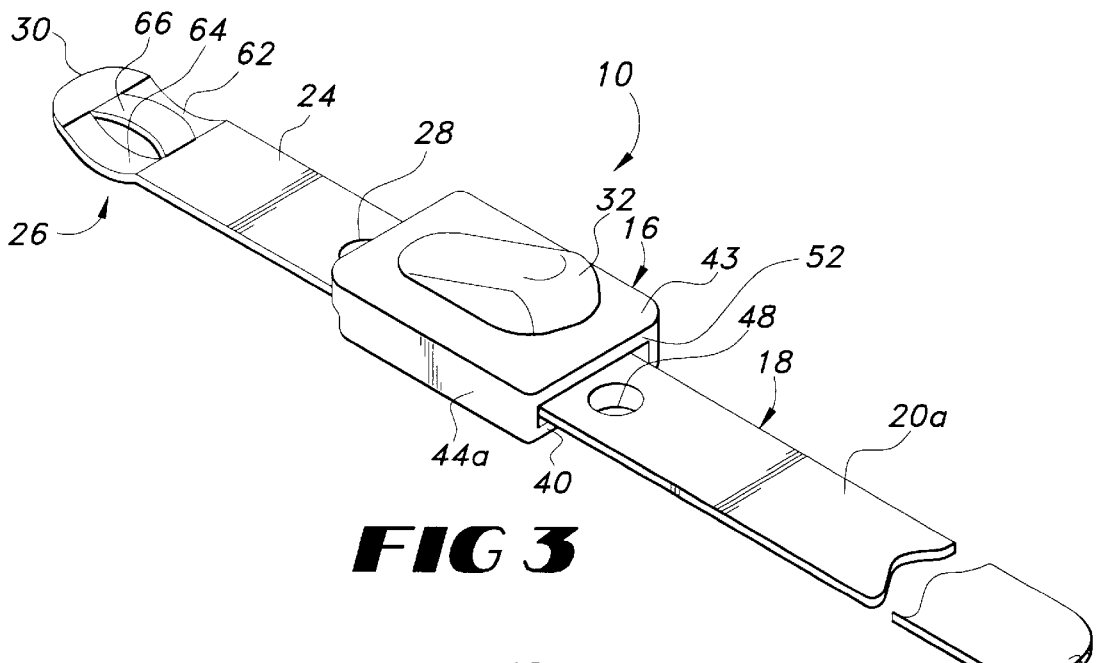
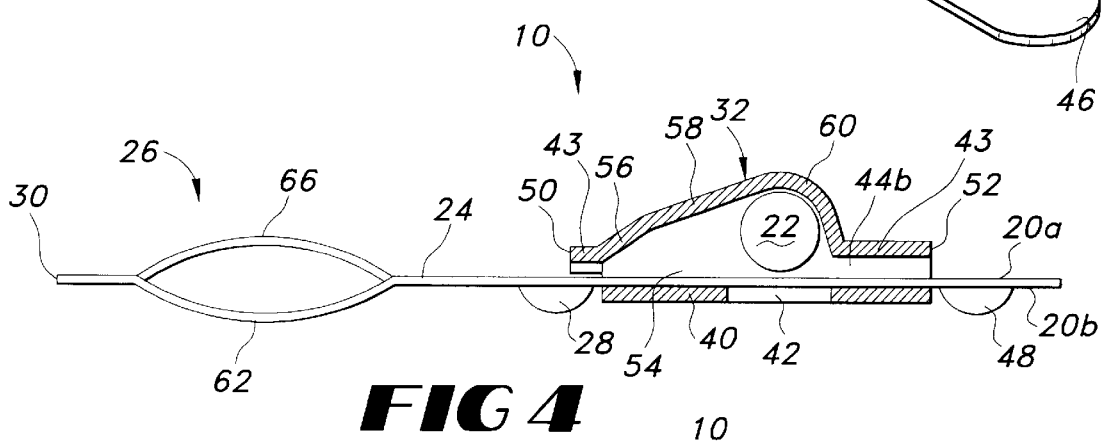
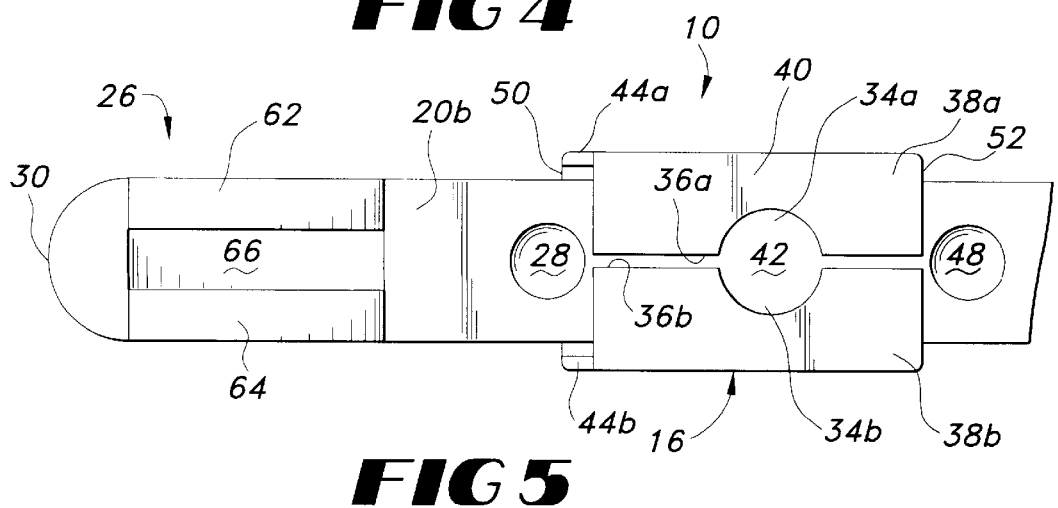

CABLE TIE

FIELD OF THE INVENTION

The present invention relates generally to bundling and attachment devices and more specifically to cable ties for holding an article or group of articles together in a bundle. In even greater particularity, the present invention relates to what is referred to in the art as a "ball-lock" or "roller-lock" cable tie which has a roller means in the form of either a sphere or cylindrical pin within the head of the cable tie for lockingly engaging the strap. Still, in even further specificity, the present invention relates to a ball/roller-lock cable tie which includes a means extending from the head of the tie for further enhancing the locking of the strap within the head and for enhancing the clenching of the strap around the article or group of articles being bundled.

BACKGROUND OF THE INVENTION

Plastic cable ties have become increasingly popular for a variety of bundling and attachment applications because of their relatively low initial cost and their ease of installation. However, in addition to unsuitable aging characteristics, plastic ties tend to become brittle when used at low temperatures and, when used in a high temperature, high humidity environment, tend to undergo some elongation. Moreover, plastic ties are inappropriate for certain nuclear power plant applications since radiation can result in degradation of the plastic material thereby rendering the strap more brittle. Therefore, in certain applications, it is more desirable to use a metallic cable tie. For instance, metal ties are often used in underground, corrosive, nuclear and heavy vibration environments and in situations where it is desired to use the tie as a load carrying member since the metal tie typically has a much greater tensile strength than plastic ties.

In response to drawbacks associated with using plastic cable ties in harsh environments, the industry has seen some use of metal cable ties, some of which were initially designed typically on the same principle as plastic ties. While these designs are suitable for their intended purpose, they too suffer however from requiring a very high insertion force of the strap through the head of the tie. In order to reduce the high insertion force, some metal designs have been modified to utilize a roller means in the form of either a sphere or cylindrical pin within the head for lockingly engaging the strap. These types of metallic cable ties, generally known as "ball-lock" or "roller-lock" cable ties, proved to be successful in decreasing the insertion force. In certain environments such as a heavy vibration environments, however, the locking of the strap in the head of these cable ties may become loose due to partial unwedging of the ball or pin in the head which allows retrograde movement of the strap (i.e., the strap becomes loose). This "loose fit" condition results because metal, such as steel, does not stretch during installation (i.e., does not have any noticeable elongation or memory such as plastic), thus no back force to prevent or counteract retrograde movement of the strap is present to maintain the ball or pin in the locked or wedged position.

In view of the foregoing, a need exists for a cable tie which has a means for preventing retrograde movement of the strap from its locked position and for taking up slack and maintaining tension on the strap as well as ensuring locking of the ball or pin inside the head of the tie.

SUMMARY

The present invention addresses the above needs by providing a ball/roller-lock cable tie for holding an article or group of articles together in a bundle. The cable tie includes a elongate strap body capable of being deformed to encompass the article or group of articles; a locking head disposed adjacent one end of the strap body for receiving a second end of the strap body; a roller means, positioned within said locking head, for lockingly engaging the second end of the strap body thereby retaining the second end of the strap body within the locking head. The tie further includes a means extending from the locking head for enhancing the locking of the second end of the strap body within the locking head and for enhancing the clenching of the strap body around said article or group of articles being bundled. In a preferred embodiment, the means comprises a strap body extension attached to and extending from the locking head such that the extension is sandwiched between the article or articles being bundled and the second end of the strap body upon insertion into the locking head. The extension includes a spring means for supplying a reactive force necessary to substantially prevent retrograde movement of the second end of the strap body within the locking head thereby maintaining locking of the second end of the strap body within the locking head and for enhancing the clenching of the strap body around the article or group of articles being bundled.

BRIEF DESCRIPTION OF THE DRAWINGS

These and other features, aspects, and advantages of the present invention will become better understood with regard to the following detailed description and accompanying drawings where:

FIG. 3 is a perspective view of the cable tie illustrated in FIG. 1 embodying characteristics of the present invention;

FIG. 4 is a side elevational view, partially in section, of the cable tie illustrated in FIG. 1 embodying characteristics of the present invention;

FIG. 5 is a bottom plan view of the cable tie illustrated in FIG. 1 embodying characteristics of the present invention;

DETAILED DESCRIPTION

Figure 1:
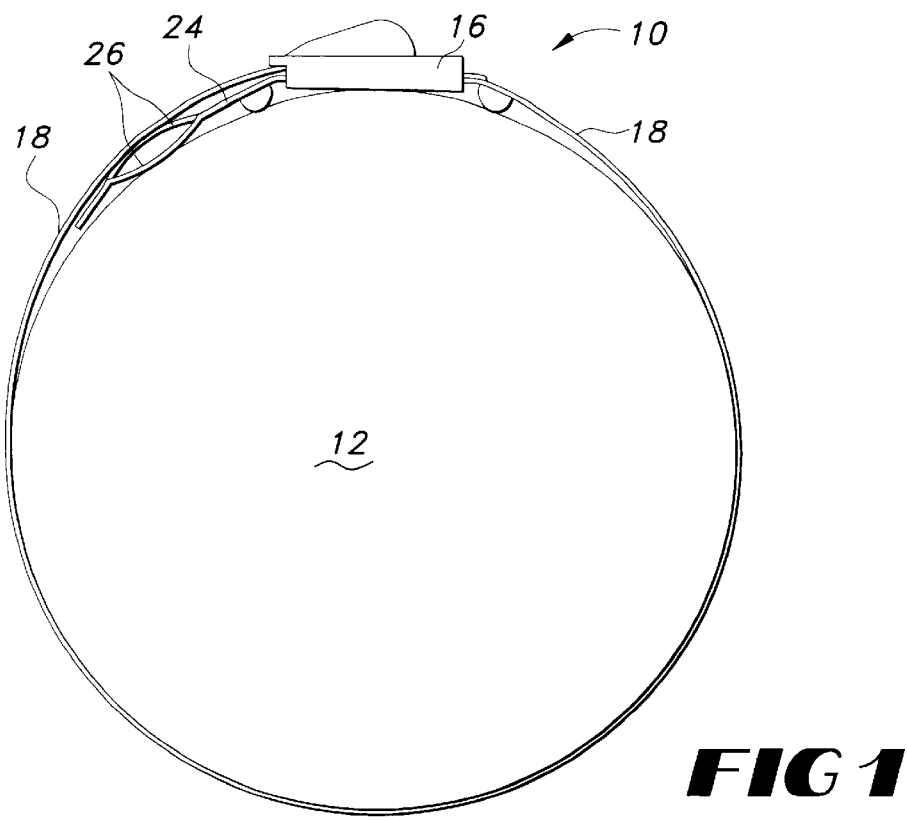
FIG. 1 is a side elevational view of a representative cable tie embodying characteristics of the present invention.
Figure 2:
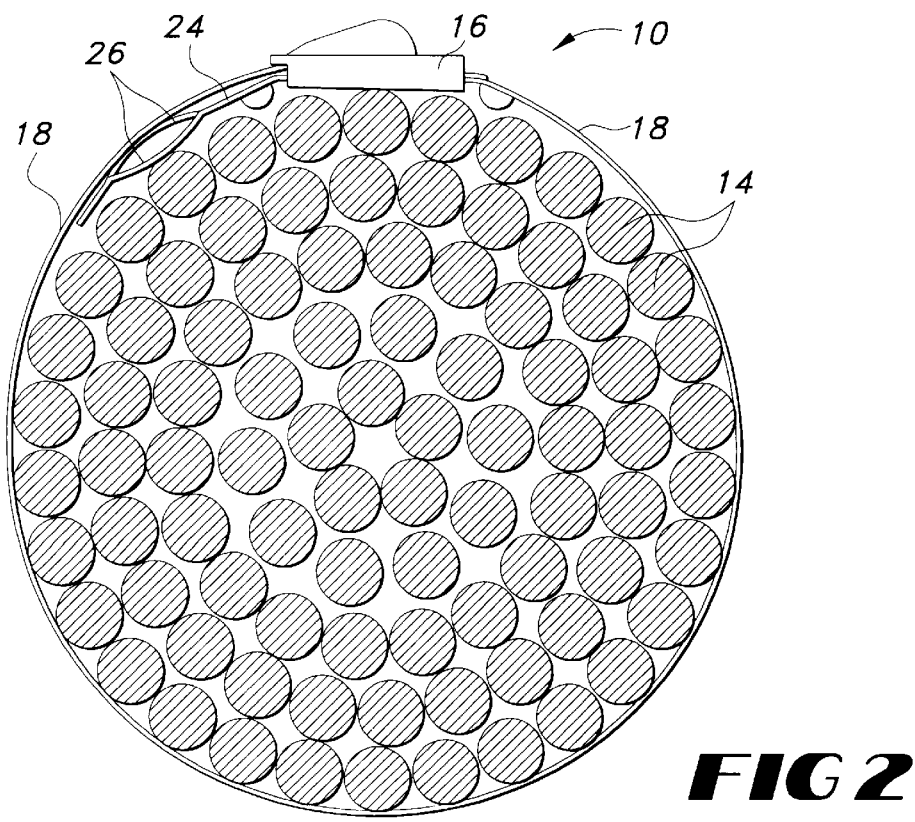
FIG. 2 is a side elevational view of the cable tie illustrated in FIG. 1 embodying characteristics of the present invention.

Referring now to the drawings for a better understanding of the present invention, a representative cable tie for encircling an article, such as a pipe or pole 12, or for forming and holding a group of articles together in a bundle, such as wires 14, is generally indicated in FIGS. 1–8 by reference numeral 10. Cable tie 10 is an elongate member including: a locking head 16; an elongate strap body 18, preferably planar shaped having first and second opposed surfaces 20a and 20b, attached to and extending from locking head 16; a roller means, preferably in the form of a ball or sphere 22 as best shown in FIGS. 4 and 6–8, for retaining strap body 18 within locking head 16; and a strap body extension 24, including a spring means 26, attached to and extending from locking head 16 for enhancing the locking of strap body 18 within locking head 16 by substantially preventing retrograde movement of strap 18 within head 16 and for enhancing the clenching of strap body 18 around articles 12 or 14. Cable tie 10 as shown requires low threading force, permits tightening without damaging the object or objects being held, has high tensile strength, is lightweight, has long service life and is simple and economical to manufacture.

In a preferred embodiment, locking head 16, strap body 18, roller means 22 and strap body extension 24 are formed of metal such as stainless steel to allow cable tie 10 to be used over a wide temperature range and to give the tie 10 high tensile strength and excellent resistance to corrosion in harsh environments. It should be understood, however, that some or all of the above named elements of tie 10 may be constructed out of other materials such as plastic and may assume a variety of other configurations such as changing the structure and shape of head 16 and strap 18 to accommodate a generally cylindrical locking pin in place of sphere 22 or changing the configuration of spring means 26. In this regard, while preferred embodiments of the above elements are shown in FIGS. 1–8, they are to be considered representative of equivalent structures.

Cable tie 10 of the present invention is preferably formed by first obtaining a suitable length of strap 18, depending on the application of tie 10, from a spool (not shown). Next, spring means 26, discussed more fully below, and a first projection 28 are formed in strap 18 at predetermined distances from a first end 30 of strap 18. Projection 28 is preferably formed so that it protrudes out of second surface 20b and operates to retain one end of locking head 16 at a predetermined position on strap 18 (i.e., a specific distance from first end 30). As shown in FIGS. 1–8, strap body extension 24 is an integral part of strap body 18 and is defined generally by the distance or length of strap 18 between first end 30 and first projection 28 extending from locking head 16. However, while extension 24 is preferably an integral portion of strap 18, it may also be a separate piece suitably attached to head 16 in a conventional manner.

Locking head 16 is preferably formed next from a generally flat planar metal blank (not shown) which is substantially rectangular in shape. A roof 32, as shown in FIGS. 1–4 and 6–8 preferably in the form of a totally enclosed dome, is first formed in a central portion of the metal blank. In a preferred embodiment, as best shown in FIG. 5, opposing semi-circular notches 34a and 34b are then formed through the metal blank on opposite edges 36a and 36b so that when opposite portions 38a and 38b of the blank, including notches 34a and 34b, are folded together away or beneath roof 32 such that notches 34a and 34b and edges 36a and 36b are in direct opposing relation, they define a bottom 40 of locking head 16 which underlies roof 32. As such, notches 34a and 34b cooperate to define a generally circular hole 42 through bottom 40.

The respective areas of bend of the metal blank define sidewalls 44a and 44b of locking head 16 while the portion of the metal blank surrounding roof 32 and overlying bottom 40 defines ceiling 43. Thus, it can be seen that sidewalls 44a and 44b interconnect ceiling 43 and bottom 40.

Next, the roller means of tie 10, preferably in the form of sphere 22, is inserted into locking head 16 through hole 42 in bottom 40. With the locking head 16 oriented so that sphere 22 remains suitably positioned inside of head 16, head 16 is slidably mounted onto strap body 18 over a second end 46 such that bottom 40 is adjacent second surface 20b. Head 16 is slidingly positioned on strap 18 until bottom 40 abuts or engages first projection 28. In this position, roof 32 and ceiling 43 overlie first surface 20a of strap 18 noting that sphere 22 is captively held within head 16 by roof 32 and strap 18. In order to complete the general manufacturing and assembly steps of tie 10, a second projection 48 is likewise formed in strap 18 at a predetermined position to engage an opposite end of bottom 40 of locking head 16. First and second projections 28 and 48 comprise means positioning and securing head 16 at a predetermined position on strap 18 and for substantially precluding sliding of head 16 relative to strap 18.

As best shown in FIGS. 4 and 6–8, locking head 16 includes a strap ingress end 50, a strap egress end 52 and a strap-receiving passageway 54 extending therebetween through locking head 16 which is partially defined by ceiling 43, sidewalls 44a and 44b and bottom 40. Ceiling 43 may overlie bottom 40 in substantial parallel relation thereto. Roof 32 preferably includes first and second generally straight diverging portions 56 and 58 and a converging generally arcuate portion 60. First and second diverging portions 56 and 58 and bottom 40 diverge from one another in the direction of egress end 52. In a preferred embodiment, second diverging portion 58 has a lesser divergence angle than first diverging portion 56. Conversely, arcuate portion 60 and bottom 40 converge toward one another in the direction of egress end 52. Egress end 52 of head 16 may also serve as a reaction surface for the nose of a conventional strap tightening tool (not shown).

Figure 9:
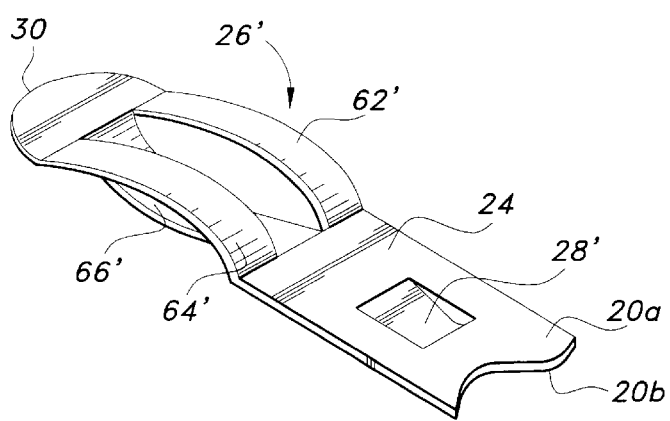
FIG. 9 is a perspective view of a portion of a cable tie showing an alternative embodiment of a spring assembly embodying characteristics of the present invention.
Figure 10:
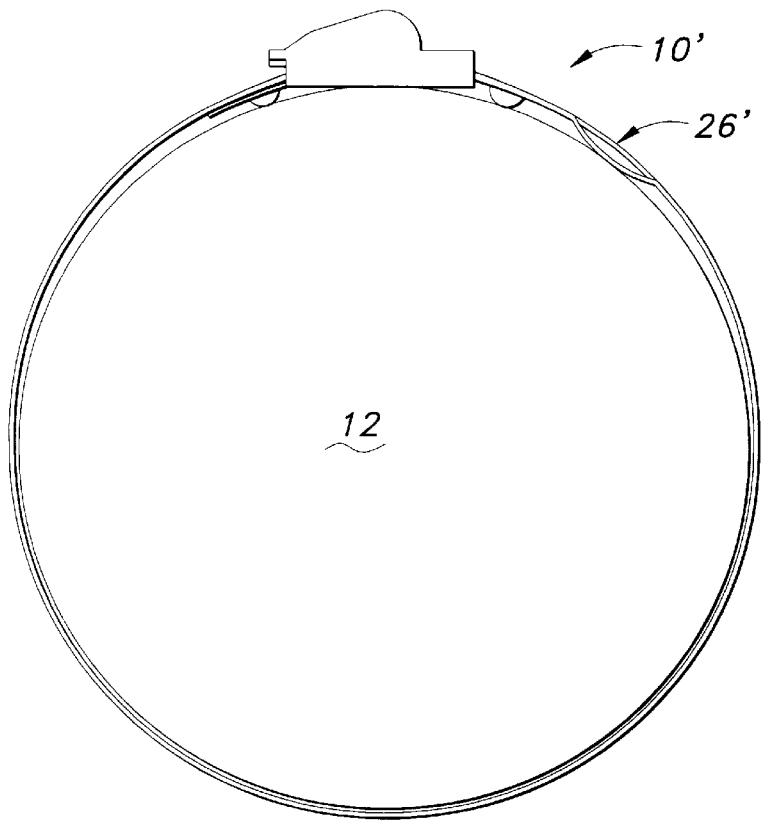
FIG. 10 is a side elevational view of an alternative embodiment of a cable tie embodying characteristics of the present invention.
Figure 11:
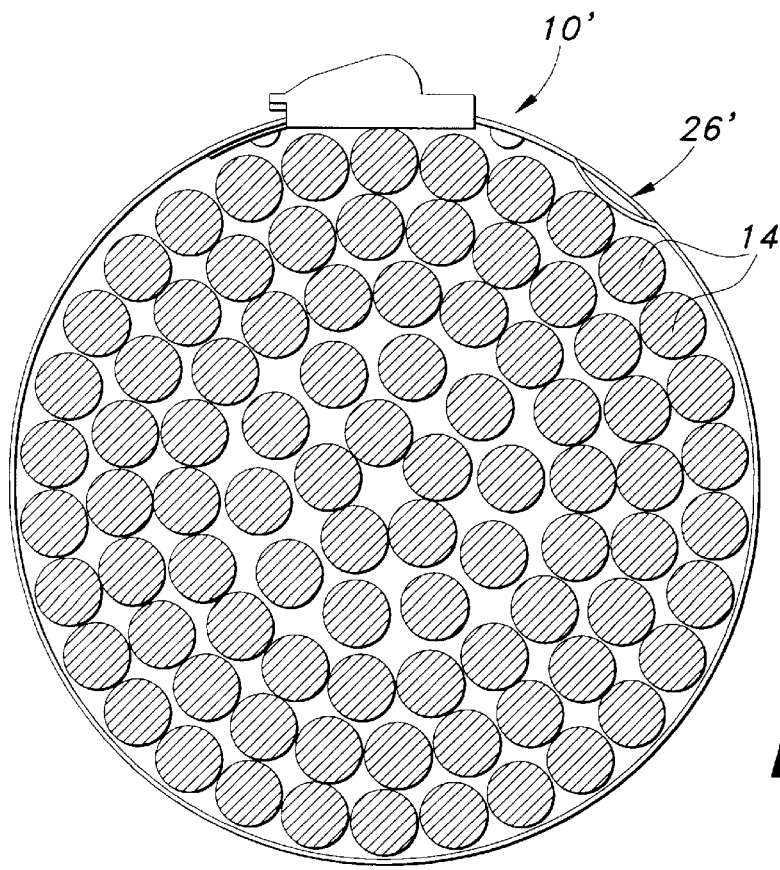
FIG. 11 is a side elevational view of the cable tie of FIG. 10 embodying characteristics of the present invention.
Figure 12:
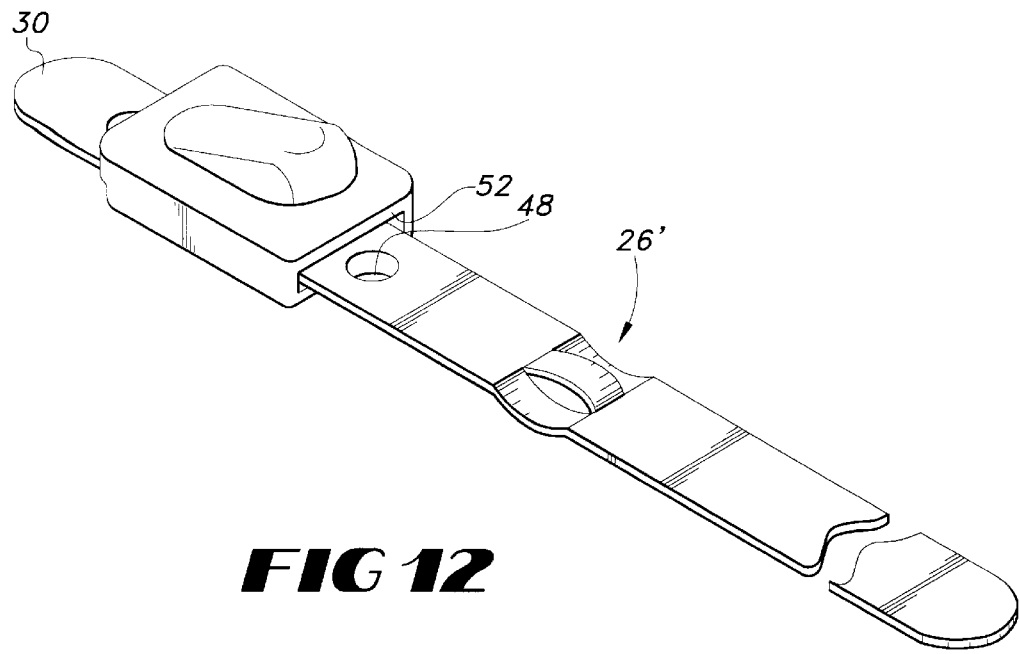
FIG. 12 is a perspective view of the cable tie of FIG. 10 embodying characteristics of the present invention.
Figure 13:
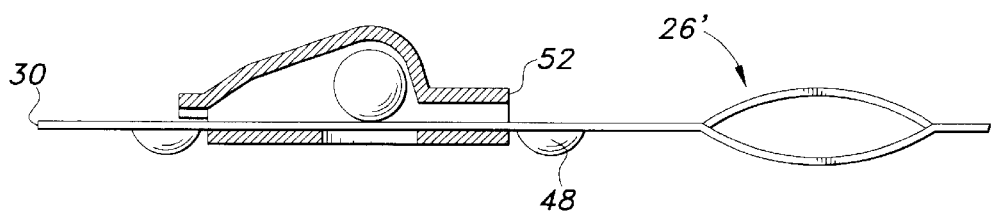
FIG. 13 is a side elevational view, partially in section, of the cable tie of FIG. 10 embodying characteristics of the present invention.
Figure 14:
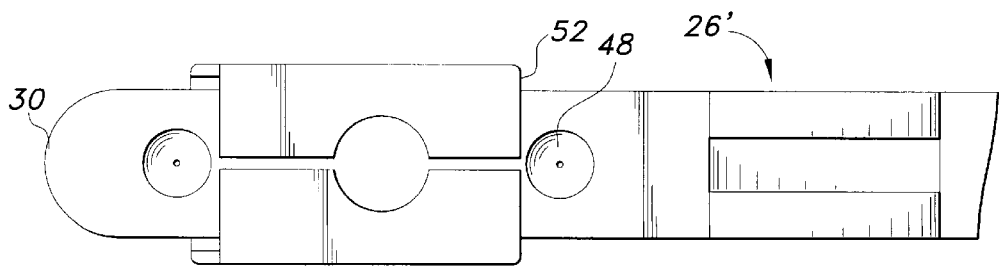
FIG. 14 is a bottom plan view of the cable tie of FIG. 10 embodying characteristics of the present invention.
Figure 15:
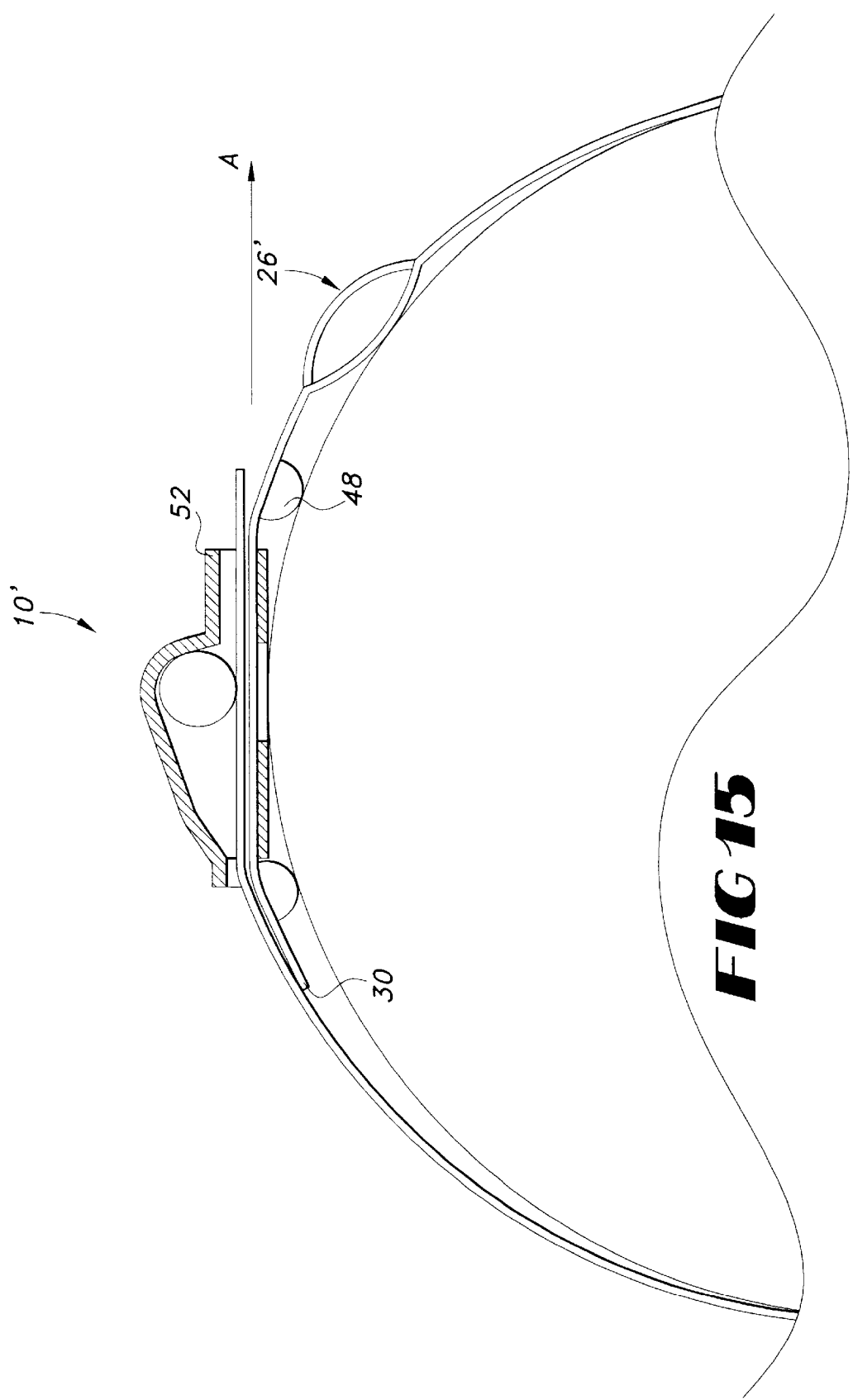
FIG. 15 is a side elevational view, partially in section, of the cable tie of FIG. 10 embodying characteristics of the present invention.
Figure 16:
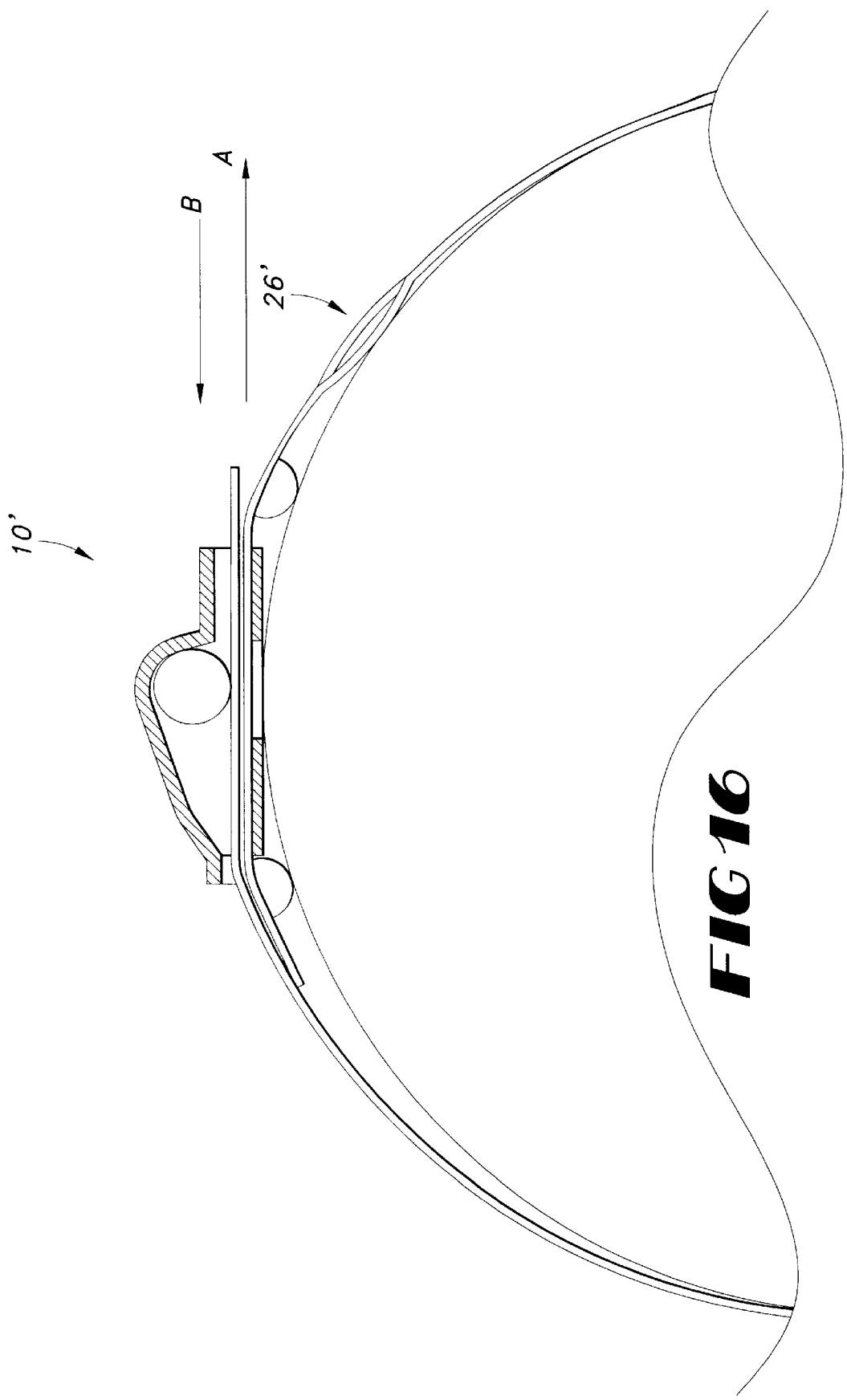
FIG. 16 is a side elevational view, partially in section, of the cable tie of FIG. 10 embodying characteristics of the present invention.
Figure 17:
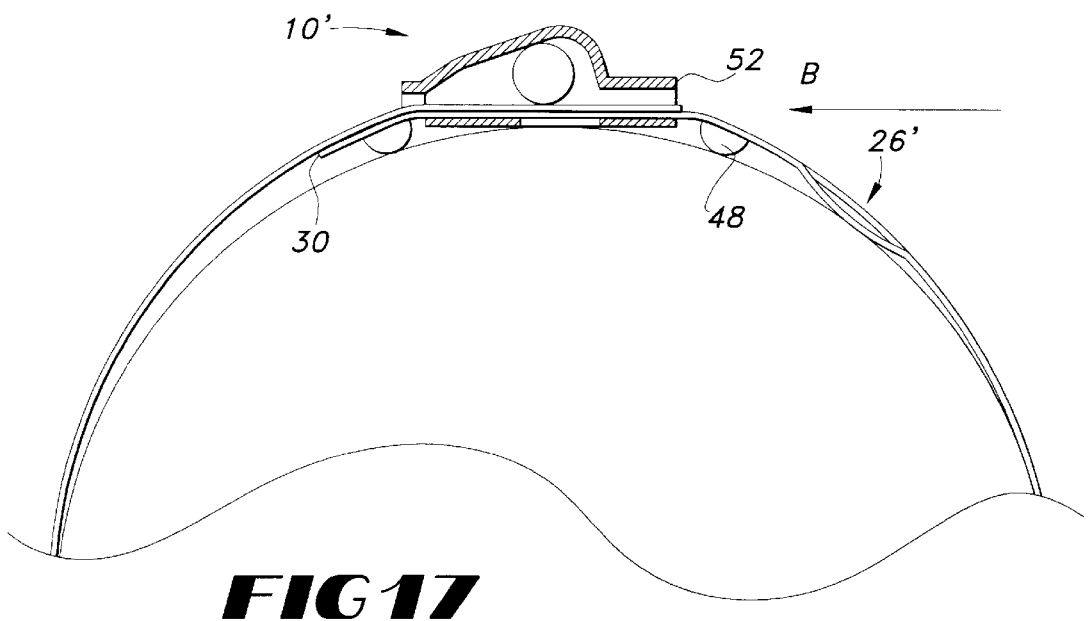
FIG. 17 is a side elevational view, partially in section, of the cable tie of FIG. 10 embodying characteristics of the present invention.
Figure 18:
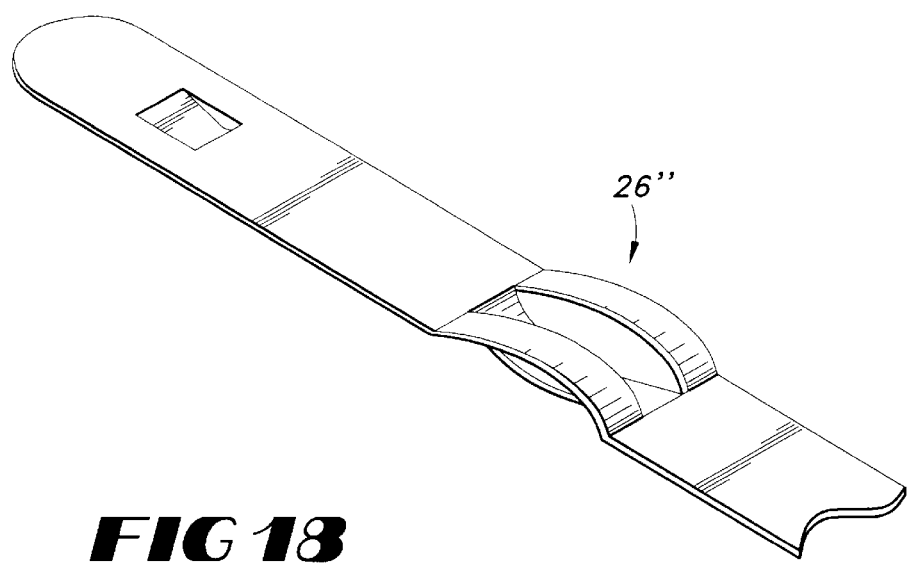
FIG. 18 is a perspective view of a portion of a cable tie showing an alternative embodiment of a spring assembly embodying characteristics of the present invention.
Figure 19:
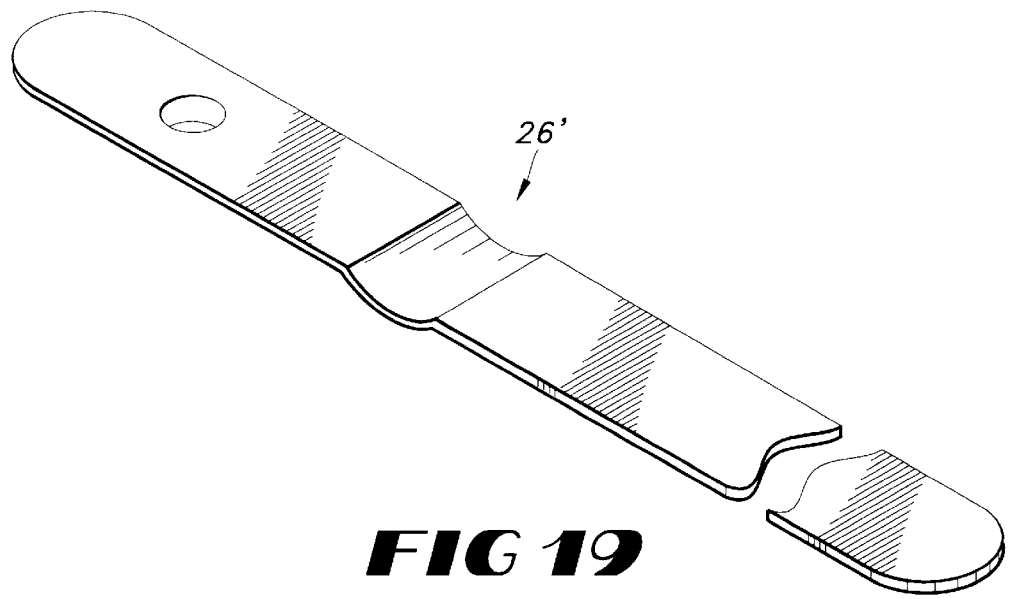
FIG. 19 is a perspective view of a portion of a cable tie showing an alternative embodiment of a spring assembly embodying characteristics of the present invention.
Figure 20:
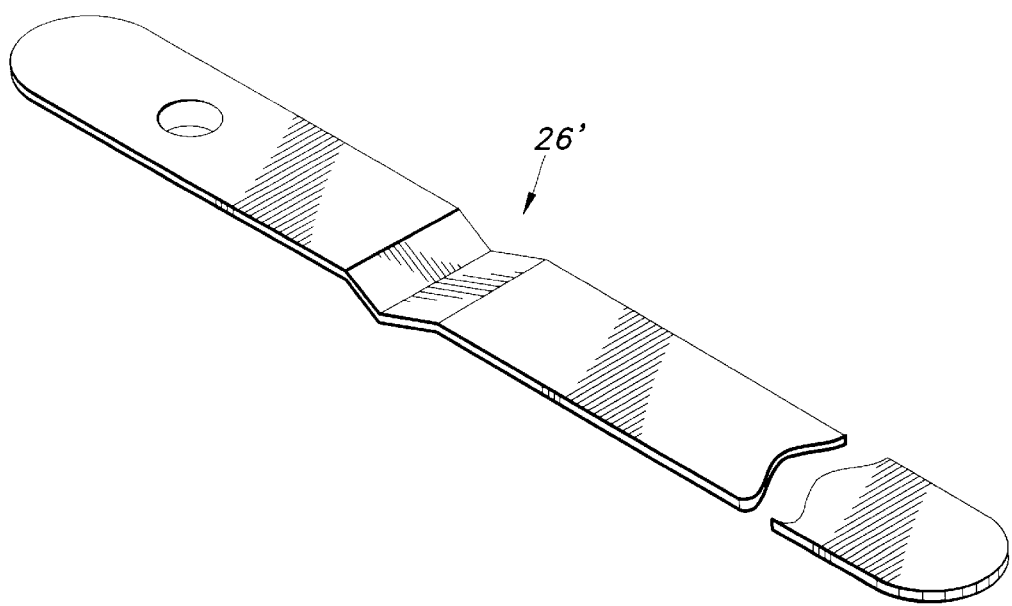
FIG. 20 is a perspective view of a portion of a cable tie showing an alternative embodiment of a spring assembly embodying characteristics of the present invention.

As best shown in FIGS. 3–5, spring means 26 preferably comprises a beam spring assembly formed out of strap 18 having first and second coextensive downwardly bowed beam springs 62 and 64 which are separated by an upwardly bowed central beam spring 66. Spring 66 bows upwardly from surface 20a of strap 18 whereas springs 62 and 64 bow downwardly from surface 20b. The spring constants of the springs may be varied by adjusting the thickness and length of the springs. It should be understood, however, that spring means 26 may assume a variety of other configurations such as shown in FIGS. 9, 19 and 20. In this regard, while separate embodiments of spring means 26 are shown throughout the several figures, they are to be considered representative of equivalent structures.

Figure 6:
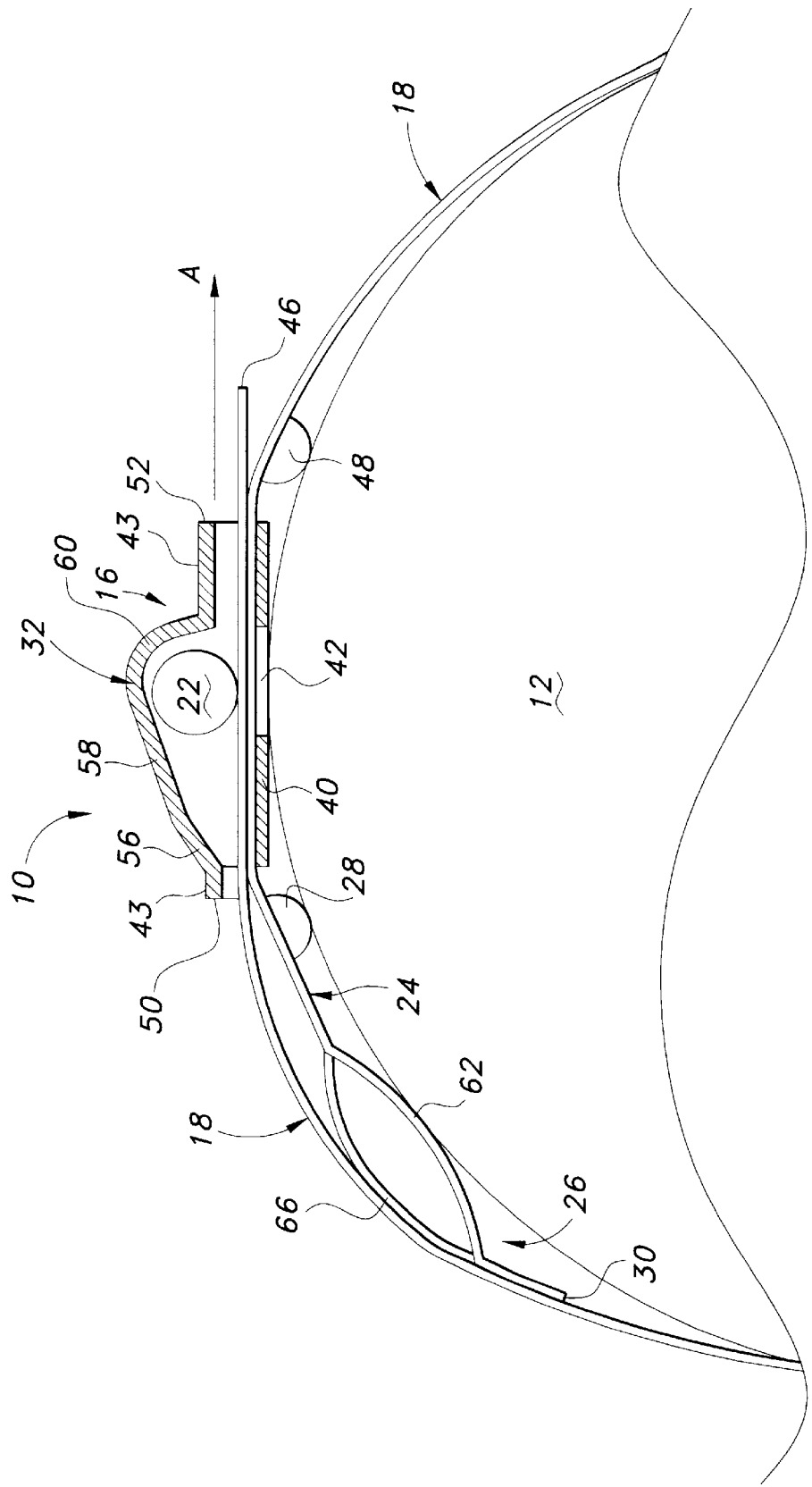
FIG. 6 is a side elevational view, partially in section, of the cable tie illustrated in FIG. 1 embodying characteristics of the present invention.
Figure 7:
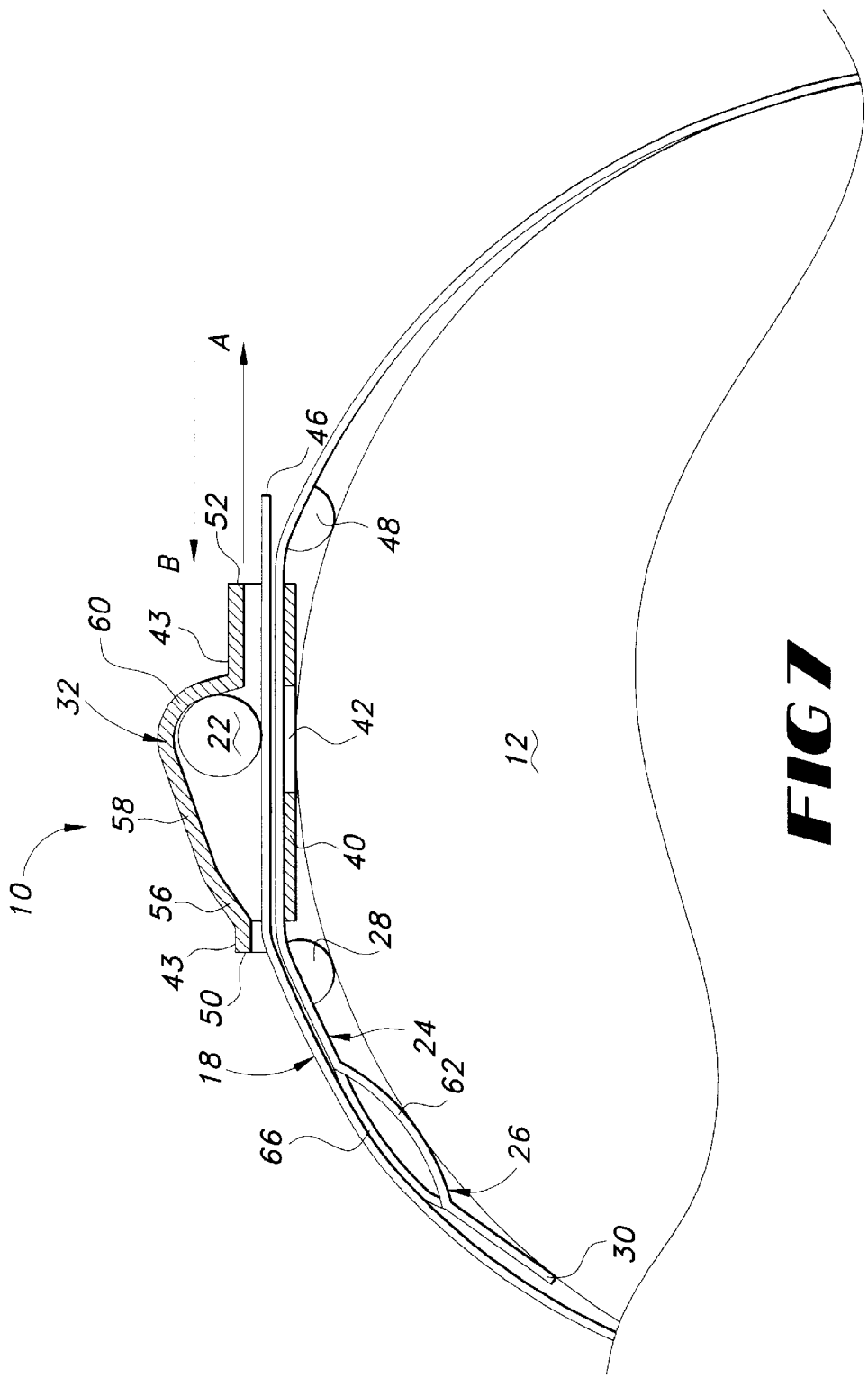
FIG. 7 is a side elevational view, partially in section, of the cable tie illustrated in FIG. 1 embodying characteristics of the present invention.
Figure 8:
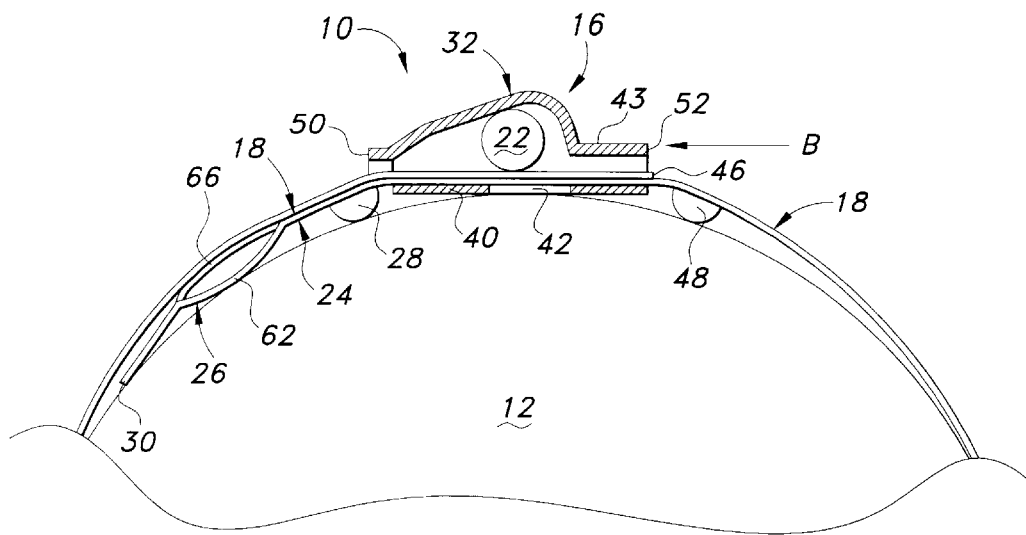
FIG. 8 is a side elevational view, partially in section, of the cable tie illustrated in FIG. 1 embodying characteristics of the present invention.

Referring to FIGS. 6–8, roller means 22 is movable within locking head 12 from a threading position, shown in FIGS. 6 and 7, wherein ball 22 may be disposed against arcuate portion 60 of roof 32 adjacent strap egress end 52, toward a locking or locked position, shown in FIG. 8, wherein ball 22 is wedged between diverging portion 58 of roof 32 and strap 18 closer to strap ingress end 50 which, in turn, wedges the strap 18 against bottom 40 thereby generally preventing retrograde movement of the strap 18 from its locked position in the locking head 16. As used herein, the terms "wedged" or "wedging" are to be accorded their broad meaning to simply indicate that in the locked position, the ball and strap are squeezed or compressed.

Operation of tie 10 is as follows: After strap 18 is deformed to encompass an article 12 or group of articles 14, second end 46 of strap body 18 is inserted in the direction of arrow A into locking head 16 through strap ingress end 50. As threading continues in the direction of arrow A through passageway 54, strap 18 engages roller means 22 lifting and moving it toward its threading position shown in FIGS. 6 and 7. It will be appreciated that threading of the strap requires very low force as ball 28 can roll on the strap 18 during threading. This is to be contrasted with prior art ties requiring much higher threading force wherein a locking tongue, biased to its locking position, has to be forcefully deflected to its threading position. Continued threading in the direction of arrow A through passageway 54 causes strap 18 to exit from the locking head 16 through strap egress end 52. Strap 18 is pulled through locking head 16 until it tightly encircles the article 12 or bundle of articles 14 to a predetermined level as shown in FIG. 7.

In the tightened position shown in FIG. 7, strap body extension 24 and spring means 26 underlie and are sandwiched between the portion of the strap 18 just prior to being inserted into locking head 16 and the article 12 or articles 14 being bundled. Thus, it can be seen that tightening of the strap 18 necessarily compresses the springs 62, 64 and 66 of spring means 26. In a preferred embodiment, spring 62 engages surface 20b of strap 18 while springs 64 and 66 engage articles 12 or 14. The reactive force exerted by the springs upon being compressed is transferred from the article 12 or articles 14 to the portion of the strap being inserted through head 16, which, in turn, exerts a substantial force in the direction of arrow B.

Referring to FIG. 8, after strap 18 is tightened to a predetermined level, release of the strap 18 in conjunction with the force from springs 62, 64 and 66 causes the threaded strap 18 and the ball 22 to move or recoil in the direction of arrow B toward the strap ingress end 50 until the ball 22 simultaneously engages roof 32 and the strap 18. As shown in FIGS. 7 and 8, the travel of the ball 22 between its threading position and locking position is very short. When the ball 22 is in its locking position, the frictional engagement between the ball 22 and the roof 32 and between the ball 22 and strap 18 is generally sufficient to prevent rolling of the ball 22, thus causing the strap to be tightly wedged against bottom 40. In addition, the force associated with springs 62, 64 and 66 as described above in the direction of arrow B further enhances the prevention of ball 22 from rolling thus enhances the locking of the strap 18 within head 16 by contributing to the wedging of strap 18 against bottom 40. The continuous force exerted by the springs in the direction of arrow B also maintains the clenching of strap 18 around articles 12 or 14. The ball 22, upon incipient locking, also effects permanent deformation of the strap 18 by indentation causing strap material previously underneath the ball 22 to cold flow in effect forming a rim about the indentation.

FIGS. 10–17 show a first alternative embodiment of the present invention and is designated generally as numeral 10'. Tie 10' is substantially the same as tie 10 with the exception that spring means 26 indicated as 26' is positioned at another preferred location on strap 18, preferably on the side of projection 48 distal first end 30.

In view of the above, it will be seen that the several objects of the invention are achieved and other advantageous results attained. As various changes could be made in the above constructions without departing from the scope of the invention, it is intended that all matter contained in the above description shall be interpreted as illustrative and not in a limiting sense.

What is claimed is:

1. A cable tie for holding an article or group of articles together in a bundle, said cable tie comprising:

(a) a elongate strap body capable of being deformed to encompass said article or group of articles;

(b) a locking head disposed adjacent one end of said strap body for receiving a second end of said strap body;

(c) roller means, positioned within said locking head, for lockingly engaging said second end of said strap body thereby retaining said second end of said strap body within said locking head; and (d) means extending from and attached to said locking head and positioned between said article or articles being bundled and said second end of said strap body upon insertion into said locking head, for enhancing the locking of said second end of said strap body within said locking head and for enhancing the clenching of said strap body around said article or group of articles being bundled.

2. A cable tie for holding an article or group of articles together in a bundle, said cable tie comprising:

(a) a elongate strap body capable of being deformed to encompass said article or group of articles;

(b) a locking head disposed adjacent one end of said strap body for receiving a second end of said strap body;

(c) roller means, positioned within said locking head, for lockingly engaging said second end of said strap body thereby retaining said second end of said strap body within said locking head; and (d) a strap body extension attached to and extending from said locking head such that said extension is positioned between said article or articles being bundled and said second end of said strap body upon insertion into said locking head, said extension including spring means for enhancing the locking of said second end of said strap body within said locking head and for enhancing the clenching of said strap body around said article or group of articles being bundled.

3. A cable tie for holding an article or group of articles together in a bundle, said cable tie comprising:

(a) a elongate strap body capable of being deformed to encompass said article or group of articles;

(b) a locking head disposed adjacent one end of said strap body for receiving a second end of said strap body;

(c) roller means, positioned within said locking head, for lockingly engaging said second end of said strap body thereby retaining said second end of said strap body within said locking head; and (d) a strap body extension attached to and extending from said locking head such that said extension is sandwiched between said article or articles being bundled and said second end of said strap body upon insertion into said locking head, said extension including spring means for supplying a reactive force necessary to substantially prevent retrograde movement of said second end of said strap body within said locking head thereby maintaining locking of said second end of said strap body within said locking head and for enhancing the clenching of said strap body around said article or group of articles being bundled.

4. The cable tie as claimed in claim 3, wherein said spring means comprises a beam spring assembly formed out of said strap body having first and second coextensive downwardly bowed beam springs which are separated by an upwardly bowed central beam spring.

* * * * *